(12) United States Patent
Krieg

(10) Patent No.: US 9,840,209 B2
(45) Date of Patent: Dec. 12, 2017

(54) BATTERY AND MOTOR VEHICLE

(71) Applicants: Robert Bosch GmbH, Stuttgart (DE); Samsung SDI Co., Ltd., Yongin-si, Gyeonggi-do (KR)

(72) Inventor: Berengar Krieg, Gerlingen (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 1058 days.

(21) Appl. No.: 13/932,191

(22) Filed: Jul. 1, 2013

(65) Prior Publication Data

US 2014/0001844 A1    Jan. 2, 2014

(30) Foreign Application Priority Data

Jul. 2, 2012    (DE) .................. 10 2012 211 393

(51) Int. Cl.
| | |
|---|---|
| *B60R 16/00* | (2006.01) |
| *B60L 3/00* | (2006.01) |
| *B60L 3/04* | (2006.01) |
| *B60L 11/18* | (2006.01) |

(Continued)

(52) U.S. Cl.
CPC ......... *B60R 16/005* (2013.01); *B60L 3/0046* (2013.01); *B60L 3/04* (2013.01); *B60L 11/1859* (2013.01); *B60L 11/1864* (2013.01); *H02J 7/0031* (2013.01); *H02J 7/1461* (2013.01); *B60L 2240/547* (2013.01); *B60L 2240/549* (2013.01); *B60L 2250/10* (2013.01); *B60L 2260/162* (2013.01); *H02J 2007/004* (2013.01); *H02J 2007/0037* (2013.01); *Y02T 10/7011* (2013.01); *Y02T 10/7016* (2013.01); *Y02T 10/7061* (2013.01)

(58) Field of Classification Search
None
See application file for complete search history.

(56) References Cited

U.S. PATENT DOCUMENTS 5,637,413 A * 6/1997 Fernandez ............ H02J 7/0031
                                                        320/163
2007/0145949 A1* 6/2007 Matsushima ............ H02J 7/00
                                                        320/132

(Continued)

FOREIGN PATENT DOCUMENTS

| CN | 1677788 A | 10/2005 |
|---|---|---|
| DE | 10 2008 022 469 A1 | 11/2008 |
| EP | 1 533 882 A2 | 5/2005 |

*Primary Examiner* — Jared Fureman
*Assistant Examiner* — Aqeel Bukhari
(74) *Attorney, Agent, or Firm* — Maginot, Moore & Beck LLP

(57) ABSTRACT

The present disclosure relates to a battery including a voltage-measuring apparatus, at least one reversible disconnection apparatus, and a circuit of electronic components. The voltage-measuring apparatus is configured to determine a battery voltage. The at least one reversible disconnection apparatus is configured to electrically disconnect the battery from an electrical supply system, such that the disconnection can be cancelled again, for charging or discharging the battery. The circuit of electronic components is a circuit configured to open the disconnection apparatus in the event of an undervoltage and/or an overvoltage of the battery.

14 Claims, 4 Drawing Sheets

(51) Int. Cl.
*H02J 7/00* (2006.01)
*H02J 7/14* (2006.01)

(56) References Cited

U.S. PATENT DOCUMENTS

| | | | |
|---|---|---|---|
| 2010/0085674 A1* | 4/2010 | Martins | G06F 1/28 361/93.1 |
| 2010/0226059 A1* | 9/2010 | Brown | H02J 7/0031 361/160 |
| 2012/0182648 A1* | 7/2012 | Maddali | H02H 7/065 361/21 |
| 2013/0033793 A1* | 2/2013 | Takeda | G01R 31/362 361/91.4 |

* cited by examiner

BATTERY AND MOTOR VEHICLE

This application claims priority under 35 U.S.C. §119 to patent application no. DE 10 2012 211 393.2, filed on Jul. 2, 2012 in Germany, the disclosure of which is incorporated herein by reference in its entirety.

BACKGROUND

The present disclosure relates to a battery, for example for a rechargeable battery which is constructed from lithium-ion battery cells or nickel-metal hydride battery cells, as used, for example, in electric and hybrid motor vehicles. The present disclosure therefore also relates to a motor vehicle.

Batteries are becoming increasingly widely used owing to an improved storage capacity, the ability to recharge them more frequently and higher energy densities. Batteries with a low energy storage capacity are used, for example, for small portable electronic devices such as mobile telephones, laptops, camcorders and the like, whereas batteries with a high capacity are used as energy sources for driving motors of hybrid or electric vehicles etc. or as stationary batteries.

Batteries can be formed, for example, from individual battery modules or by connecting battery modules in series, wherein the battery modules are sometimes also connected in parallel and the battery modules, for their part, can be composed of battery cells which are connected in series and/or in parallel.

Batteries can be permanently damaged by deep discharge, for example as a result of a load not being switched off, or by an overvoltage, for example by connecting said battery to a third-party electrical system with a different (higher) voltage.

For starter applications or for supplying power in motor vehicles, mobile homes, boats etc., batteries are often directly connected to the on-board electrical system and are protected against overcurrents only by a fuse.

In order to disconnect the battery from a load system, for example a traction system of a motor vehicle, on one side or on both sides, batteries can be provided with one or two disconnection apparatuses, for example contactors. In a motor vehicle system, the contactors can be open for as long as the motor vehicle is not in use and then closed only when it is established that the motor vehicle is ready to drive or the battery is to be charged.

DE 10 2008 022 469 describes a protection apparatus for a secondary battery. The secondary battery comprises an excessive-discharging detector circuit which identifies excessive discharging of the secondary battery and indicates this to a discharging control circuit which then blocks a discharging current. The secondary battery also comprises an excessive-charging detector circuit which identifies excessive charging of the secondary battery and indicates this to a charging control circuit which then blocks a charging current.

European patent EP 1 533 882 claims a set of batteries having a protection process device which, on the basis of at least one output voltage value, determines a state of the secondary battery from excessive-charging states, normal operating states and excessive-discharging states and, after a specific state, controls operations of interruption means for selectively disconnecting a discharging current or a charging current.

SUMMARY

The disclosure presents a battery and a motor vehicle having a battery of this kind. The present disclosure describes a circuit principle which protects the battery against deep discharge and/or against damage due to an overvoltage, but does not noticeably contribute to self-discharge of the battery or to further discharge during operation of the battery and in the discharged state.

The battery according to the disclosure comprises a voltage-measuring apparatus for determining a battery voltage and at least one reversible disconnection apparatus for electrically disconnecting the battery from an electrical supply system, such that the disconnection can be cancelled again, for charging or discharging the battery. The battery further comprises a circuit of electronic components, which circuit is designed to open the disconnection apparatus in the event of deep discharge and/or an overvoltage of the battery.

The battery is characterized by means, provided in one embodiment as a holding apparatus, which can be activated and which are designed, when activated, to deactivate the effect of the circuit by actively holding the disconnection apparatus closed.

In starter applications and other applications with a high power consumption or output, the battery voltage of a battery with an unproblematic state of charge can also fall below the deep-discharge threshold for a certain time without the battery being put at risk. The means according to the disclosure make it possible to be able to use batteries with overvoltage protection and deep-discharge protection in these applications.

In one embodiment of the battery, the disconnection apparatus is a semiconductor switch or a bistable relay, wherein opening the disconnection apparatus interrupts a supply of voltage to the circuit. This allows the disconnection apparatus to remain open even when the circuit is not supplied with power.

In a further embodiment of the battery, the circuit comprises at least one comparator for comparing the specific battery voltage with at least one threshold value. This allows the circuit to be realized in a current-saving manner.

The at least one threshold value can comprise a deep-discharge threshold value, wherein the circuit opens the disconnection apparatus if the specific battery voltage is lower than the deep-discharge threshold value. As an alternative or in addition, the at least one threshold value can comprise an overvoltage threshold value, wherein the circuit opens the disconnection apparatus if the specific battery voltage is higher than the overvoltage threshold value.

The means can be designed to be activated after the specific battery voltage falls below the deep-discharge threshold value and to remain active for a predetermined period of time. Therefore, deep-discharge protection is possible in starter applications and other applications with a high power consumption.

The means can be designed to be activated after the specific battery voltage exceeds the overvoltage threshold value and to remain active for a predetermined period of time. Therefore, overvoltage protection is possible in applications with a high power output.

The circuit can comprise an apparatus for receiving an activation signal for activating the means. Deactivation of the protection for applications can then be selectively controlled from the outside.

In one embodiment, the voltage tap of the circuit is placed on the poles of the battery, wherein the supply of voltage to the circuit is interrupted when the disconnection apparatus is opened. In the case of deep discharge, this allows further discharge of the battery through the circuit to be prevented.

When a voltage which is above the switch-off voltage is applied from outside, the disconnection device is closed again.

Advantageous developments of the disclosure are described in the description.

BRIEF DESCRIPTION OF THE DRAWINGS

Exemplary embodiments of the disclosure will be explained in greater detail with reference to the following description and the drawings, in which.

DETAILED DESCRIPTION

Figure 1:
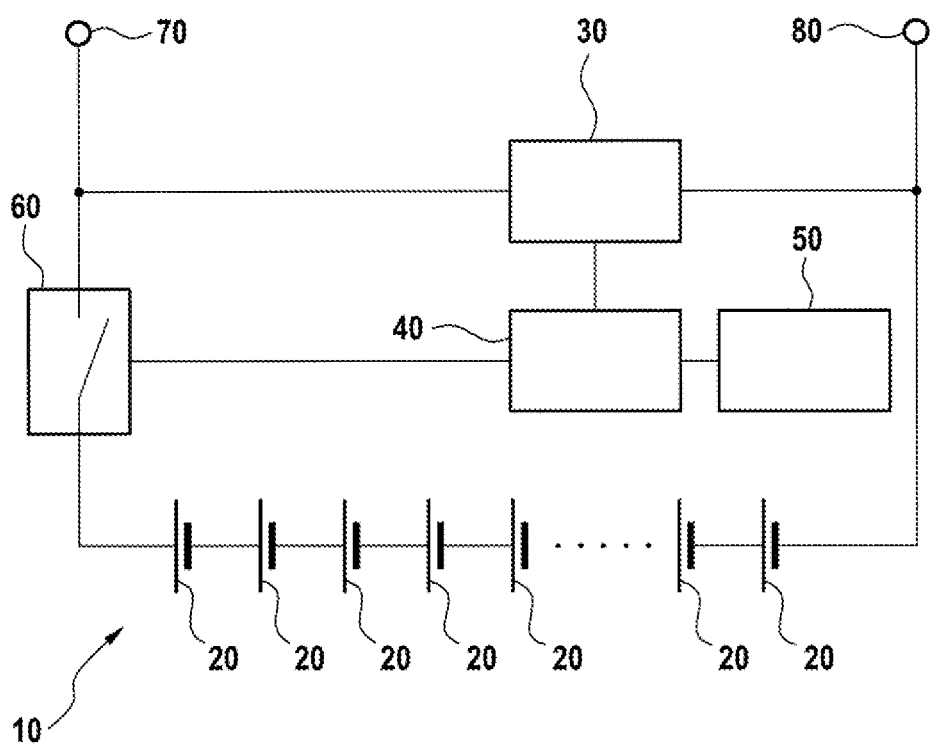
FIG. 1 shows an exemplary circuit diagram of an embodiment of the battery according to the disclosure.

The present disclosure describes a circuit which can be made up of electronic components with a low level of power consumption and which effectively protects a battery against damage due to improper, yet entirely probable, use. This is expedient primarily in high-quality batteries, for example batteries based on lithium-ion technology. Damaging deep discharge may result, for example, due to an electrical load not being switched off.

In one exemplary embodiment, the circuit is designed to disconnect battery cells of the battery from the load when a lower switch-off threshold, also called deep-discharge threshold value, is undershot by opening a disconnection apparatus which is realized, for example, as a bistable relay or as a semiconductor element.

In this case, the lower switch-off threshold is selected such that it does not yet result in damage to the battery cells, but the energy content remaining in the battery cells after switch-off is not sufficient for meaningful further operation of the load.

This lower switch-off threshold can be selected in a manner dependent on the battery capacity and/or on the chemistry used in the battery cells. For batteries with very continuous characteristic curves, this design is more difficult than for batteries of which the voltage drops severely in the empty state, as is the case, for example, in lithium-ion batteries and occurs to a particularly pronounced extent when using lithium-iron phosphate in lithium-ion batteries.

If the battery is switched off on account of virtually complete discharging of the battery, this switch-off is cancelled again when a voltage which is above the switch-off voltage is applied to the battery poles, for example by a charging device or by a starting aid.

Contact-connecting a voltage source with an unsuitably high voltage to the battery can also damage the battery. This can occur, for example, with a 24-volt battery in a starting aid for a 12-volt or 16-volt battery or by charging the battery with an unsuitable or incorrectly set charging device.

Therefore, in one exemplary embodiment, the circuit is designed, as an alternative or in addition, to check for the battery voltage exceeding an upper switch-off threshold, also called the overvoltage threshold value, and to likewise disconnect the battery cells from the battery contacts when the switch-off threshold is exceeded.

In a further embodiment, the protective switch-off means can also be combined with any battery electronics system which may be present, for example a battery management system BMS or an electronic battery sensor EBS. These systems are usually only active when requested by a superordinate monitoring unit (for example motor controller or "ignition on").

If a battery electronics system of this kind identifies a brief peak load, for example starting of an internal combustion engine, which can lead to a voltage drop below the lower switch-off threshold even when the battery is charged, switch-off can optionally be temporarily suppressed. Furthermore, the protective circuit described here can be integrated in a battery electronics system for battery state identification.

An electronic circuit and a reversible disconnection apparatus which is controlled by this circuit can be integrated in the battery between at least one battery pole for establishing contact between the battery and the load system/charging device and the battery cells. The circuit can be designed to be supplied with voltage via the battery poles at which voltage detection is also carried out. Opening the disconnection apparatus then also interrupts the supply voltage to the circuit by the battery and further deep discharge of the battery by the circuit is avoided.

If, at the moment of switch-off, the battery is the only energy source for the electrical supply system which is connected to the poles, the circuit is no longer supplied with power either and the disconnection apparatus remains open if the disconnection apparatus is designed such that it remains open even when the circuit is not supplied with power. This is possible by virtue of a bistable relay or a suitable semiconductor switch.

If a further voltage source with a voltage above the lower switch-off threshold is connected to the electrical supply system, which is connected to the poles, after switch-off, for example by a starting aid or charging device in the case of a motor vehicle battery, the disconnection apparatus is closed again by means of the circuit with a very small delay or even no delay at all, and the battery can be recharged.

When a battery based on nickel-metal hydride or lithium ions, in particular lithium-iron phosphate in this case, is used, the voltage does not drop particularly severely under loading, but exhibits a highly non-linear behavior in the discharged state.

Figure 4:
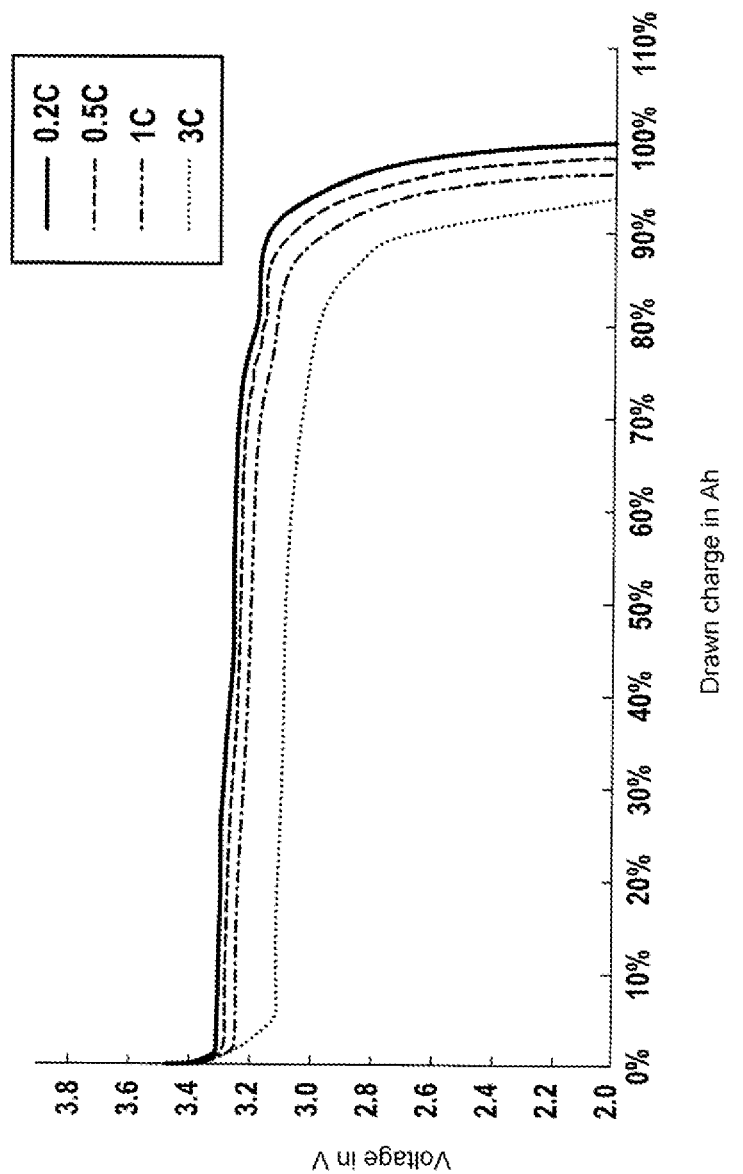
FIG. 4 shows voltage drop curves at different current intensities for an exemplary lithium-iron phosphate cell.

FIG. 4 shows voltage drop curves at different current intensities for an exemplary lithium-iron phosphate cell. In this case, it is clear that the cell voltage is virtually constant over a wide charging range and also drops to a slight extent under loading, but drops dramatically in relation to the discharged state when more than 95% of the capacity has already been drawn. In this case, a switch-off threshold of approximately 2.1 V per cell, based on a 12 V battery which could be made up of four such cells, that is to say a threshold of 8.4 V, can be implemented by way of example.

Figure 3:
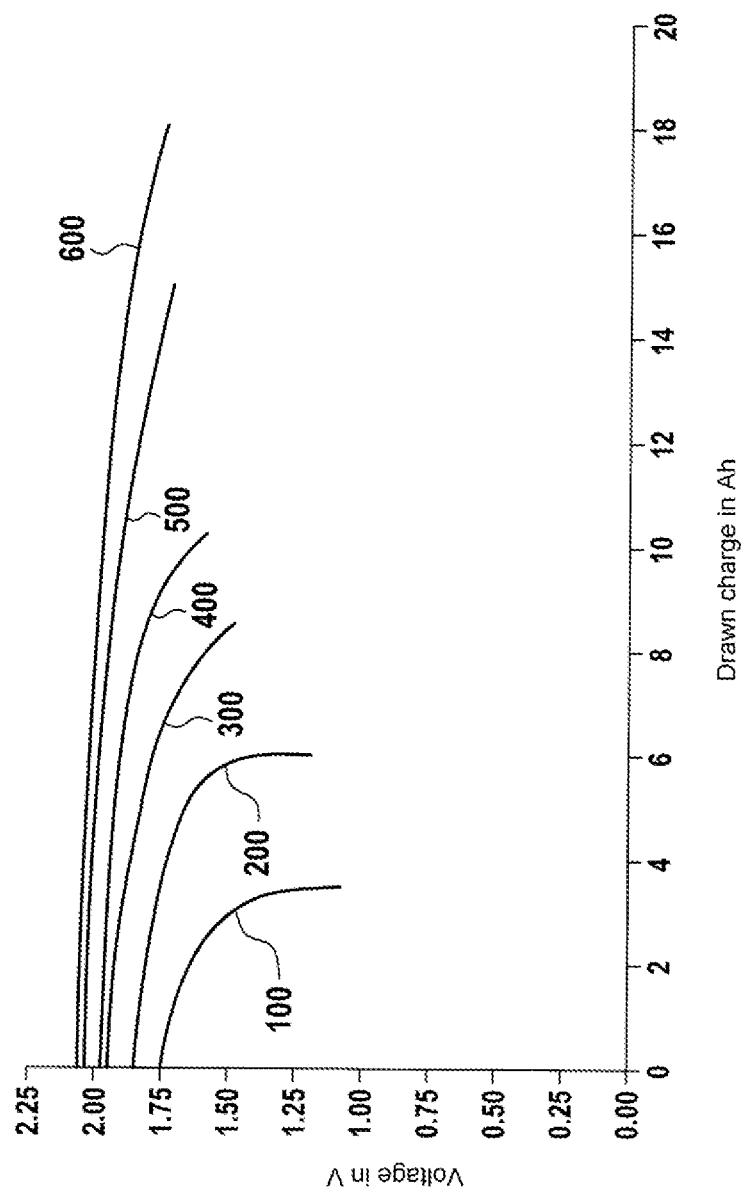
FIG. 3 shows voltage drop curves at different current intensities for an exemplary lead-acid cell.

For batteries of the lead-acid type, the switch-off threshold is more difficult to determine since this type of battery has an extremely high internal resistance and therefore the voltage already drops noticeably under comparatively low loading. FIG. 3 shows voltage drop curves at different current intensities for an exemplary 20 Ah lead-acid battery. It can be seen that very different charging quantities can be drawn from the cells at different currents before the voltage drops below a threshold, for example 1.75 volts. For example, a loading with a first current intensity, curve 500, causes a discharge of 75%; for example 15 of 20 Ah drawn before the voltage falls below 1.75 V per cell. However, a loading with a higher second current intensity, curve 400, allows only a discharge of 45%, for example 9 of 20 Ah drawn before the voltage drops below 1.75 V per cell.

However, in some applications or in suitable embodiments, the circuit can also advantageously be used for batteries of the lead-acid type.

For example, in one embodiment, provision is thus made to design the circuit such that the lower switch-off threshold depends on a discharge current intensity such that even very different discharge currents lead to switch off in the case of similar discharge states.

If the voltage between the battery poles is below the lower switch-off threshold predetermined by the design of the circuit, in one embodiment the circuit triggers opening of the disconnection apparatus only after the switch-off condition has been present in an uninterrupted manner for a certain period of time. Examples include 1 to 10 seconds, depending on the application, in order to suppress accidental switch-off of the battery in the case of peak loading.

Operation/charging of a battery with a considerably higher voltage than the rated voltage of the battery potentially leads to excessive charging and increased aging, that is to say also to damage to the battery.

Therefore, in addition or as an alternative, an upper switch-off threshold can optionally be implemented, said upper switch-off threshold being monitored to check whether it is exceeded by the pole voltage and likewise leading to disconnection of the pole from the cells. For example, the battery can be protected against charging voltages which damage the battery by a slight change or extension of the circuit described up until this point. A delay time until the battery is switched off can be provided in this case too. It is advantageously shorter, for example 0.5 to 1 second.

In this case, holding the disconnection switch closed can also suppress switch-off in the event of an overvoltage, however embodiments in which switch-off cannot be suppressed in the event of an overvoltage would also be possible.

If a battery with a circuit of this kind is used, for example, to supply power to a 12 V on-board electrical system in a vehicle, and an attempt is made to start the vehicle with a HGV battery with a 24 V rated voltage using a starting aid, or to use an unsuitable or incorrectly set charging device for charging the battery, a protective circuit with an upper switch-off threshold which can be implemented in addition or as an alternative disconnects the battery cells from the terminals until the voltage across the terminals is again in a range which is not harmful to the battery.

In particular, it is possible to realize a circuit of this kind using high-resistance voltage dividers and few comparators or other active electronic components. In addition, a bistable relay or a suitable semiconductor switch with low energy consumption in the static state can be used as the disconnection apparatus. In this case, a circuit of this kind does not make a substantial contribution to self-discharge of the battery and can remain active permanently, that is to say even during storage of the battery.

Therefore, the circuit can be arranged in the battery such that it is also supplied with power by the battery cells even when the disconnection apparatus is open. However, in order to prevent further discharge of a battery which has already been discharged after protective switch-off by the circuit, the circuit can also be supplied with power from the pole side of the disconnection apparatus and not directly from the battery cells, with the result that opening the disconnection apparatus interrupts the supply of voltage by the cells.

In some applications, vehicle batteries have now been equipped with intelligent systems for battery state identification. One example is the Bosch electronic battery sensor, also called EBS.

High-quality batteries are sometimes equipped with battery management systems, also called BMS. Sometimes, equipping batteries in this way is even absolutely necessary for correct operation.

These systems are generally active only when their functionality is requested, for example, by means of a superordinate control unit for motor control. However, if a system of this kind is activated, the circuit described here can optionally be temporarily deactivated. If, for example, a BMS or an EBS identifies that the battery has a good state of charge and a voltage drop below the switch-off threshold has occurred only on account of a high loading, means which actively hold the disconnection switch closed, in order to permit the motor to be started even with a low voltage drop for example, can be activated in the circuit by the BMS or the EBS, depending on the application, by a signal to an input of the circuit. Another application example relates to a switched-on hazard warning light system of a vehicle which has broken down or been involved in an accident, the supply voltage to said hazard warning light system being maintained if this still leads to a perceivable warning action even if this leads to discharge of the battery to below the lower switch-off threshold. Maintaining the hazard warning function in this way is optionally restricted to cases in which an accident or breakdown sensor indicates a breakdown or accident to the BMS or EBS.

In the event of a breakdown or accident, it may be more expedient to maintain perceivable further operation of the hazard warning light system using the energy remaining in the battery rather than to protect the battery against deep discharge in order, specifically, to prevent, for example, another road user running into the unlit broken-down vehicle, even though the energy remaining in the battery would still be sufficient to maintain the perceivable hazard warning functionality for some time.

If a BMS/EBS is integrated in the battery, the functionality of the various embodiments of the circuit can optionally also be realized in a manner partly integrated in this electronics system too.

FIG. 1 shows an exemplary embodiment of a battery 10 according to the disclosure. Battery cells 20 are electrically connected in series and supply voltage to terminals 70, 80 of the battery 10 if a switching contact in a disconnection apparatus 60 is closed. The disconnection apparatus 60 is electrically connected to a circuit 40 such that the circuit 40 can open and close the switching contact of the disconnection apparatus 60 by actuating the disconnection apparatus 60 using control signals. A battery-voltage measuring apparatus 30 measures the voltage which is applied between the poles 70, 80 of the battery 10 and transmits the measured voltage to the circuit 40. In the illustrated exemplary embodiment from FIG. 1, the circuit 40 can prespecify temporary suppression of the disconnection. Means 50 which are connected to this input can be, for example, an electronic circuit (EBS or motor controller) or an input keyboard.

Figure 2:
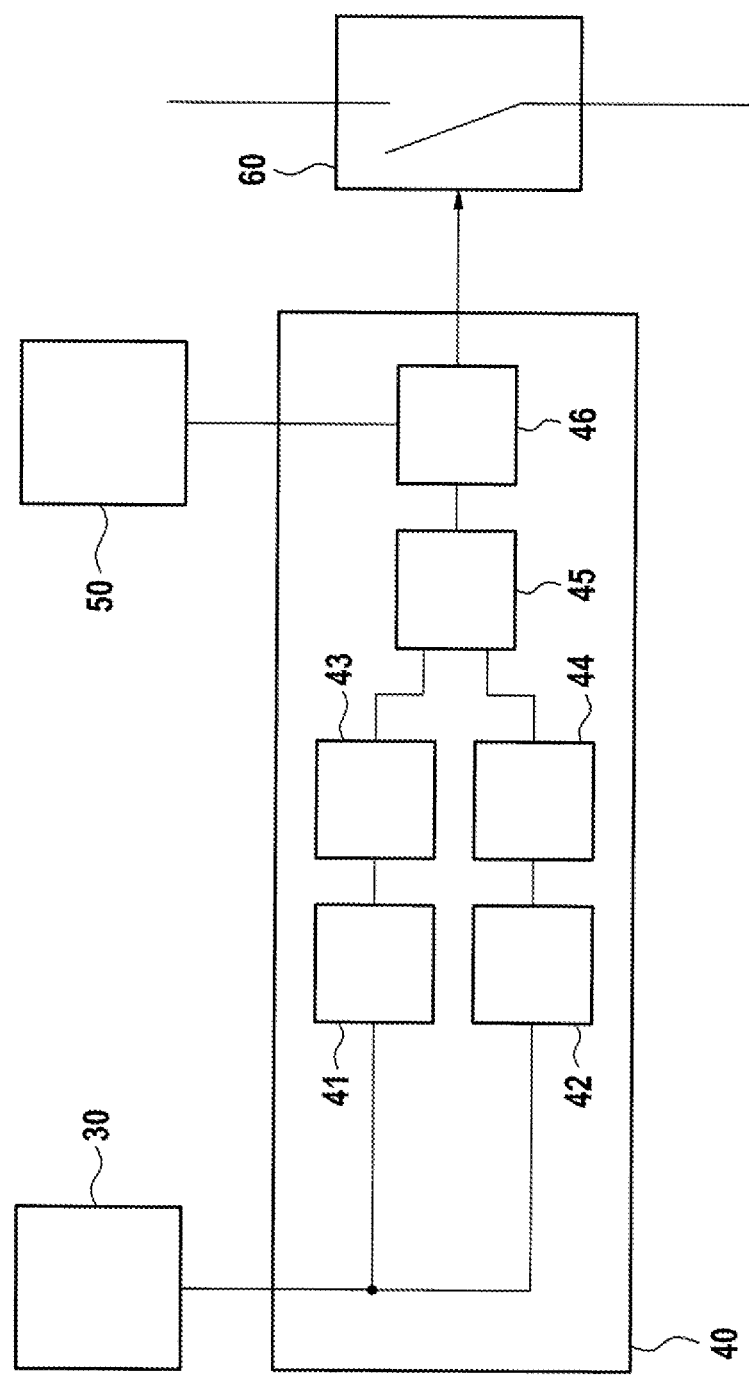
FIG. 2 shows an exemplary circuit diagram of an embodiment of the circuit contained in the battery according to the disclosure.

FIG. 2 shows an exemplary embodiment of the circuit 40. In this case, the circuit 40 has two inputs. The measured battery voltage is made available to the two comparators 41 and 42 via one input. Suppression of the triggering of the disconnection element 60 can be triggered by means of the other input.

The comparators 41 and 42 have two different triggering thresholds and a different response behavior. The comparator 41 compares the battery voltage with a set lower threshold and is at the lower output level from amongst a possible high and a possible low output level when the battery voltage falls below the lower switch-off threshold. The comparator 42 compares the battery voltage with a set upper threshold and is at the low output level when the battery voltage exceeds the upper switch-off threshold. The two delay elements 43 and 44 delay the drop in the output level of the comparators for different times, depending on whether the lower threshold has been undershot or the upper threshold has been exceeded. A high output level of the comparators is not delayed by the delay elements. The OR switching element 45 receives the delayed level of the comparators 41 and 42 and is at the low level at its output if at least one of the comparators 41 and 42 or the delay elements 43 and 44 outputs the low level. The output level of the OR switching element 45 is applied to an input of the disconnection apparatus 60 which causes an electrical interruption when the low level is applied. The interruption in the supply of voltage to the circuit 40 causes the comparators 41 and 42, the delay elements 43 and 44, the OR switching element 45 and therefore the circuit 40 to continue to maintain a low level and the interruption, which is caused by the disconnection apparatus 60, when power is not supplied to the circuit 40.

The switching element 46 ensures optional suppression of switch-off by an intelligent battery system, which is embodied in the BMS or EBS, or an input keyboard 50. Independently of the supply of voltage to the circuit 40, the switching element 46 has a high output level when a high output level is received by the means 50, otherwise the output level of said switching element follows the output level of the OR switching element 45 as far as possible without delay.

What is claimed is:

1. A battery comprising:
   a voltage-measuring apparatus configured to determine a battery voltage;
   at least one reversible disconnection apparatus configured to electrically disconnect the battery from an electrical supply system, such that the disconnection can be cancelled again, for charging or discharging the battery;
   a circuit including electronic components, the circuit being configured to open the at least one reversible disconnection apparatus in the event of at least one of (i) a deep discharge, and (ii) an overvoltage of the battery; and
   a holding apparatus configured to be activated and, when activated, configured to deactivate an effect of the circuit by actively holding the at least one reversible disconnection apparatus closed, wherein the circuit further includes a receiving apparatus configured to receive an activation signal to activate the holding apparatus for at least a duration of the activation signal.

2. The battery according to claim 1, wherein:
   the at least one reversible disconnection apparatus is a semiconductor switch or a bistable relay, and
   opening the at least one reversible disconnection apparatus interrupts a supply of voltage to the circuit.

3. The battery according to claim 1, wherein the circuit further includes at least one comparator configured to compare a specific battery voltage with at least one threshold value.

4. The battery according to claim 3, wherein:
   the at least one threshold value comprises a deep-discharge threshold value, and
   the circuit opens the at least one reversible disconnection apparatus if the specific battery voltage is lower than the deep-discharge threshold value.

5. The battery according to claim 4, wherein the holding apparatus is activated after the specific battery voltage falls below the deep-discharge threshold value, and remains activated for a predetermined period of time.

6. The battery according to claim 3, wherein:
   the at least one threshold value comprises an overvoltage threshold value, and
   the circuit is configured to open the at least one reversible disconnection apparatus if the specific battery voltage is higher than the overvoltage threshold value.

7. The battery according to claim 6, wherein the holding apparatus is activated in response to the specific battery voltage exceeding the overvoltage threshold value, and remains activated for a further predetermined period of time.

8. The battery according to claim 1, wherein:
   the battery is configured to provide a supply of voltage to the circuit, and
   opening the at least one reversible disconnection apparatus comprises interrupting the supply of voltage to the circuit.

9. The battery of claim 1 further comprising:
   at least one lithium-iron phosphate cell.

10. The battery of claim 1 wherein the battery management system is operatively connected to the holding apparatus to operate the holding apparatus to deactivate the effect of the circuit during starting of an internal combustion engine that requires power from the battery.

11. The battery of claim 1 wherein the circuit is further configured to close in response to connection of a voltage source to the battery to enable charging of the battery.

12. The battery of claim 1 wherein the receiving apparatus is connected to a battery management system that generates the activation signal for activating the holding apparatus.

13. The battery of claim 1 wherein the receiving apparatus is connected to a hazard warning light system in a motor vehicle that generates the activation signal for activating the holding apparatus.

14. A motor vehicle comprising:
   an electrical supply system; and
   a battery including
      a voltage-measuring apparatus configured to determine a battery voltage,
      at least one reversible disconnection apparatus configured to electrically disconnect the battery from the electrical supply system, such that the disconnection can be cancelled again, for charging or discharging the battery,
      a circuit including electronic components, the circuit being configured to open the at least one reversible disconnection apparatus in the event of at least one of (i) a deep discharge, and (ii) an overvoltage of the battery, and
      a holding apparatus configured to be activated and, when activated, configured to deactivate the effect of the circuit by actively holding the at least one reversible disconnection apparatus closed, wherein the circuit further includes a receiving apparatus configured to receive an activation signal to activate the holding apparatus for at least a duration of the activation signal.

* * * * *